United States Patent
Suzuki et al.

(10) Patent No.: US 12,000,961 B2
(45) Date of Patent: Jun. 4, 2024

(54) LIDAR DEVICE

(71) Applicant: DENSO CORPORATION, Kariya (JP)

(72) Inventors: Hidemasa Suzuki, Kariya (JP);
Shunpei Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 943 days.

(21) Appl. No.: 16/936,384

(22) Filed: Jul. 22, 2020

(65) Prior Publication Data
US 2020/0348399 A1 Nov. 5, 2020

Related U.S. Application Data

(63) Continuation of application No. PCT/JP2019/002092, filed on Jan. 23, 2019.

(30) Foreign Application Priority Data

Jan. 24, 2018 (JP) .................... 2018-009655

(51) Int. Cl.
*G01S 7/481* (2006.01)
*G01S 17/08* (2006.01)
*G01S 17/931* (2020.01)
*G02B 26/10* (2006.01)

(52) U.S. Cl.
CPC .......... *G01S 7/4817* (2013.01); *G01S 7/4813* (2013.01); *G01S 7/4815* (2013.01); *G01S 17/08* (2013.01); *G01S 17/931* (2020.01); *G02B 26/105* (2013.01)

(58) Field of Classification Search
CPC .............................. G01S 7/4817; G01S 7/4813
See application file for complete search history.

(56) References Cited

U.S. PATENT DOCUMENTS

2007/0024941 A1 * 2/2007 Mochizuki ........... G02B 26/126
359/204.1
2014/0332676 A1 * 11/2014 Bayha .................. G01S 7/4813
250/227.26

FOREIGN PATENT DOCUMENTS

DE 102011108683 A1 * 1/2013 ........... G01S 17/936
EP 0 248 823 B1 12/1987
JP 11106222 A * 4/1999 ........... C03B 11/122
(Continued)

OTHER PUBLICATIONS

Machine translation of DE-102011108683-A1 (Year: 2013).*
Machine translation of JP-11106222-A (Year: 1999).*

*Primary Examiner* — Yuqing Xiao
*Assistant Examiner* — Zhengqing Qi
(74) *Attorney, Agent, or Firm* — MASCHOFF BRENNAN

(57) ABSTRACT

A light detection module projects a light beam to scan the light beam in a scanning direction, and receives a light beam arriving from a scanning region of the light beam. The light detection module is arranged such that a scanning center indicative of a center of the scanning of the light beam is located to be different from a window center of an optical window in the scanning direction. The optical window has a target surface that is one of the outer side surface and the inner side surface. The target surface has a cross-section along a scanning surface of the transmitted light beam. The scanning surface is defined by the scanning direction of the transmitted light beam and the transmission direction of the light beam from the light detection module. The cross-section of the target surface is shaped to be asymmetrical about the window center.

9 Claims, 12 Drawing Sheets

(56) References Cited

FOREIGN PATENT DOCUMENTS

JP      2002-236178 A     8/2002
JP         5621165 B2   10/2014

\* cited by examiner

LIDAR DEVICE

CROSS REFERENCE TO RELATED APPLICATION

The present application claims the benefit of priority from Japanese Patent Application No. 2018-009655 filed on Jan. 24, 2018, the entire disclosure of which is incorporated herein by reference.

TECHNICAL FIELD

The present disclosure relates to a lidar device including a light deflector.

BACKGROUND

Lidar devices may include a deflection mirror used as a light deflection device which is rotated to deflect light for scanning. The term "lidar" is also written as "LIDAR", which is an acronym for Light Detection and Ranging.

SUMMARY

An exemplary aspect of the present disclosure provides a lidar device including a light detection module and an optical window.

The optical window is configured to enable a transmitted light beam to pass therethrough, and a received light beam to pass therethrough. The optical window has a target surface that is one of an outer side surface and an inner side surface thereof. The target surface has a cross-section along a scanning surface of the transmitted light beam. The scanning surface is defined by the scanning direction of the transmitted light beam and the transmission direction of the light beam from the light detection module. The cross-section of the target surface is shaped to be asymmetrical about the window center.

BRIEF DESCRIPTION OF THE DRAWINGS

The object described above, other objects, features, and advantages of the present disclosure will become apparent from the following description of embodiments with reference to the accompanying drawings in which.

DESCRIPTION OF EMBODIMENTS

Viewpoint

Figure 1:
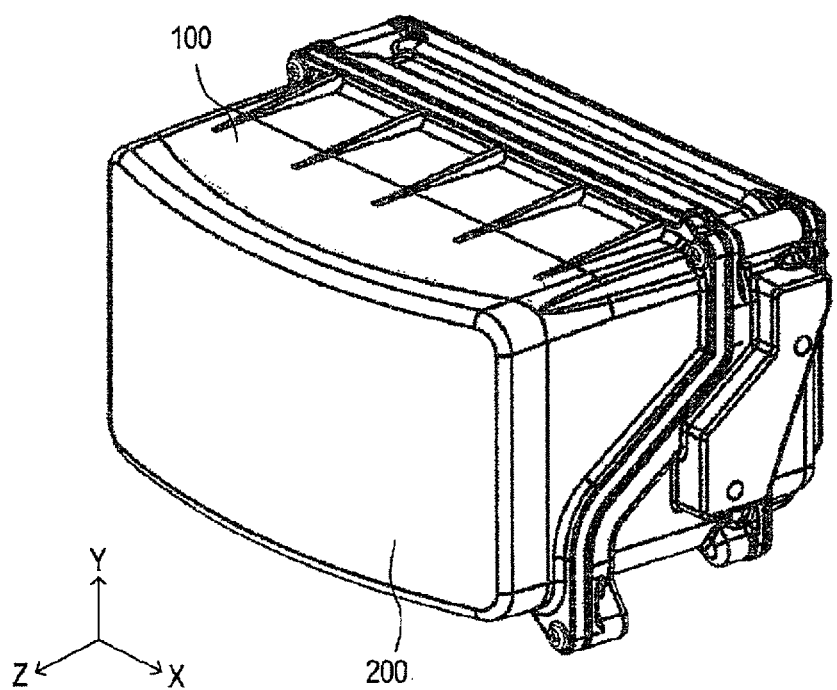
FIG. 1 is a perspective view of a lidar device.

Such a lidar device has a housing formed with an opening and an optical window attached in the opening. That is, the lidar device is configured such that a light beam is passed through the optical window from the inside to the outside of the housing and vice versa.

Such a lidar device also includes a light receiving lens and a curved cover of the lens, referred to as a curved lens cover. The curved cover is attached in the opening to serve as the optical window.

The light receiving lens may have a diameter close to that of the curved lens cover. In this case, the optical window, i.e. the curved lens cover, may have an influence on the light receiving lens, which may cause, for example, the image formation capability of the light receiving lens to deteriorate.

To avoid such an influence of the optical window on the light receiving lens, Japanese Patent Publication No. 5621165 discloses a technique of adjusting the curvature, thickness, distance to the light receiving lens, or other parameters of the optical window, i.e., the curved lens cover.

However, the disclosing persons have discovered the following problems with the conventional technique disclosed in the published patent document after their detailed study of the conventional technique.

The conventional technique requires the center of light-beam scanning to be located on the optical window's central axis which passes through the center thereof. The optical window is symmetric about the central axis thereof. If the conventional technique is applied to a lidar device designed such that the center of light-beam scanning is not located on the central axis of the optical window, the light receiving lens may be less capable of forming an image in any measurement direction. This therefore may make the conventional technique inapplicable for such designed lidar devices. In cases where a rotatable deflection mirror is used for light-beam scanning, the center of light-beam scanning is located on the central axis of rotation of the rotatable deflection mirror.

One aspect of the present disclosure provides techniques, each of which is capable of preventing a light receiving lens from suffering an optical window's influence resulting from the center of light-beam scanning being located offset from the central axis of the optical window.

A lidar device according to an exemplary aspect of the present disclosure includes a light detection module and an optical window.

The light detection module is disposed in a housing that has an opening. The light detection module being configured to transmit a light beam in a predetermined transmission direction to scan the transmitted light beam in a predetermined scanning direction, and receive a light beam arriving from a scanning region of the light beam. The optical window is attached to the opening of the housing, and is curved toward the outside of the housing. The optical window has (i) a window center in the scanning direction, (ii) an outer side surface facing an outside of the housing, and (iii) an inner side surface facing an inside of the housing. The optical window is configured to enable the transmitted light beam to pass therethrough, and the received light beam to pass therethrough.

The light detection module is arranged such that a scanning center indicative of a center of the scanning of the light beam is located to be different from the window center in the scanning direction.

The optical window has a target surface that is one of the outer side surface and the inner side surface.

The target surface has a cross-section along a scanning surface of the transmitted light beam. The scanning surface is defined by the scanning direction of the transmitted light beam and the transmission direction of the light beam from the light detection module. The cross-section of the target surface is shaped to be asymmetrical about the window center.

Even if the center of the scanning is located to be different from the window center, the shape of the optical window is configured to have an asymmetrical shape in the scanning direction. This configuration enables influences on respective light beams passing through different points of the optical window to be substantially identical to one another.

Embodiments

A present embodiment of the present disclosure will now be described with respect to the drawings.

1. Configuration

FIG. 1 illustrates a lidar device 1 according to the present embodiment. The lidar device 1 is mounted on a vehicle, and is used, for example, to detect various objects around the vehicle. The term "lidar" is also written as "LIDAR", which is an acronym for Light Detection and Ranging.

As illustrated in FIG. 1, the lidar device 1 includes a housing 100 and an optical window 200.

The housing 100 is a rectangular-parallelepiped resin casing. The casing has a substantially rectangular side which has an opening. The housing 100 has a light detection module 2 (described later) disposed therein.

The optical window 200 is a resin lid fixed to the housing 100 so as to close the opening thereof. The optical window 200 enables laser light transmitted from the light detection module 2 inside the housing 100 to pass therethrough.

In the following description, an X-axis direction is defined as extending along a longer side of the substantially rectangular opening of the housing 100; a Y-axis direction is defined as extending along a shorter side of the opening; and a Z-axis direction is defined as extending orthogonal to the X-Y plane.

Note that the X-axis direction has a left side and a right side when viewed from a point that faces the opening of the housing 100, and the Y-axis direction has an upper side and a lower side when viewed from a point that faces the opening of the housing 100. A side of the opening of the housing 100 is defined as a front side, and a side of the housing 100, which is opposite to the side of the opening, is defined as a rear side. The Z-axis direction has a front side and a rear side that respectively refer to the front side of the housing 100 and the rear side thereof.

2. Light Detection Module

Figure 2:
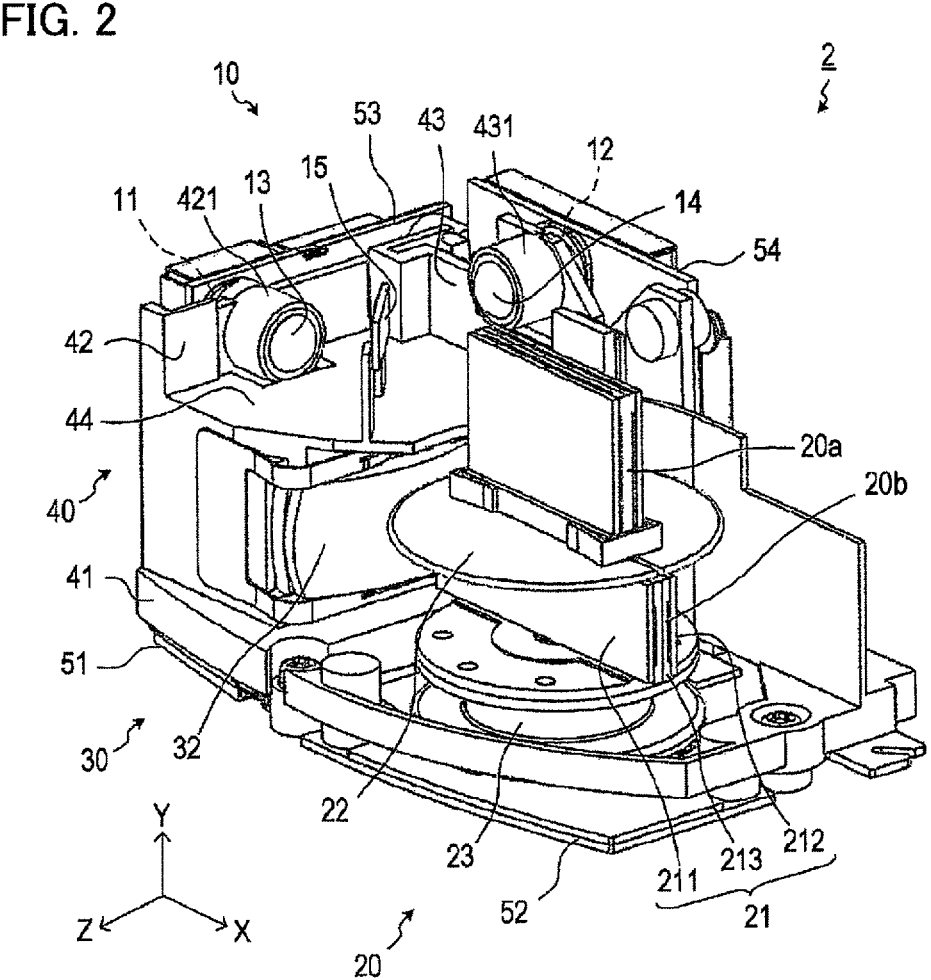
FIG. 2 is a perspective view of the lidar device, illustrating the structure of a light detection module disposed in a housing of the device.
Figure 3:
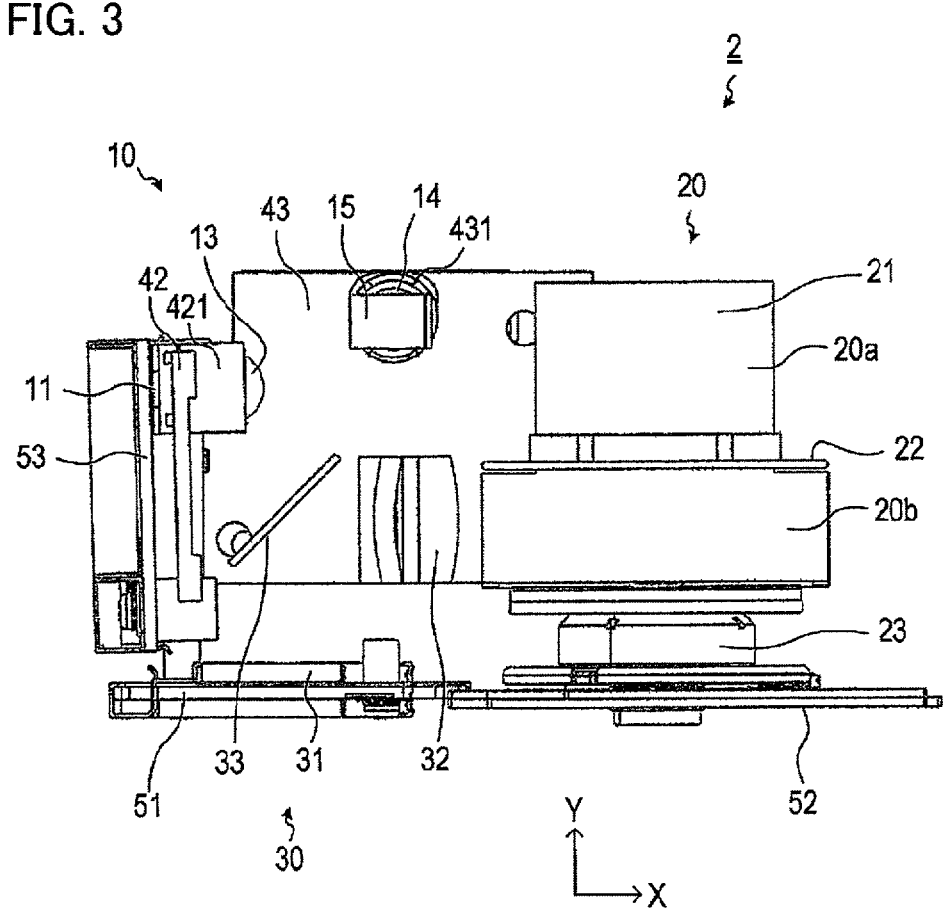
FIG. 3 is a front view of the light detection module having its components integrally installed in a frame partially illustrated.
Figure 4:
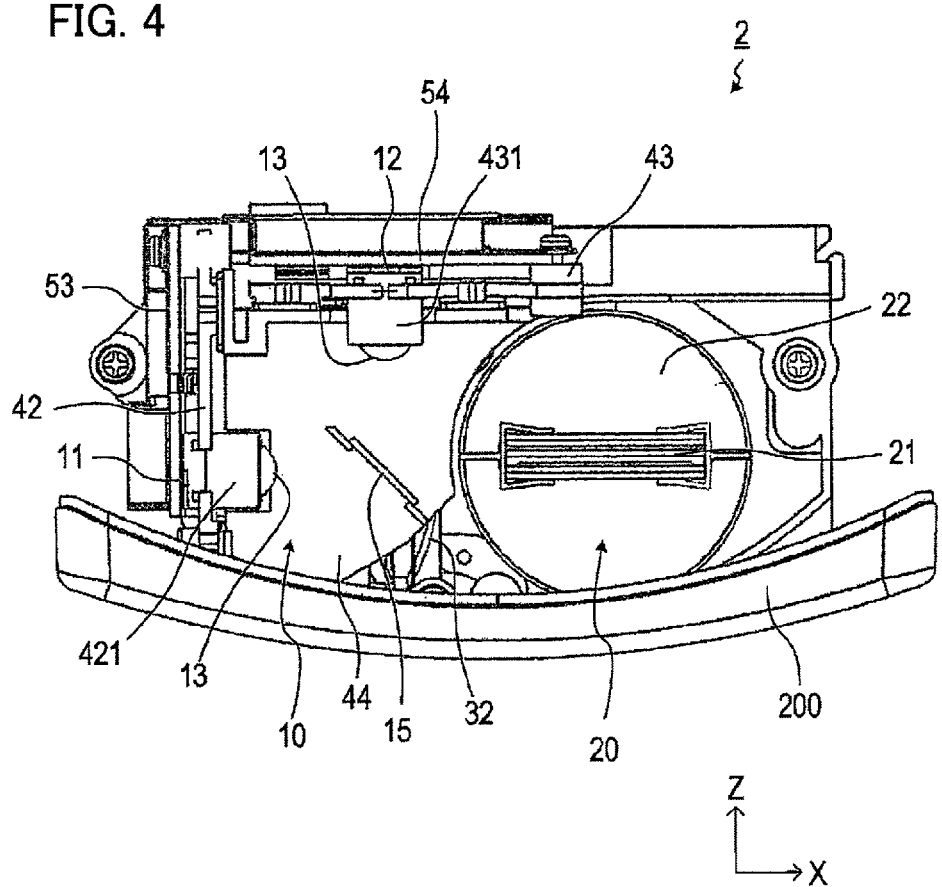
FIG. 4 is a plan view of the lidar device, with the housing omitted.

As illustrated in FIGS. 2 to 4, the light detection module 2 includes a phototransmitter 10, a scanner 20, and a photoreceiver 30. The light detection module 2 is mounted to the housing 100 via a frame 40.

[2-1. Scanner]

The scanner 20 includes a mirror module 21, a partition plate 22, and a motor 23.

The mirror module 21 includes a flat plate-like member having opposing major surfaces, and a pair of deflection mirrors 211 and 212, which can reflect light, mounted on the respective major surfaces.

The mirror module 21 has a combined shape of two rectangles each having opposing longer sides. The length of the longer side of one of the two rectangles is different from the length of the longer side of the other thereof.

Specifically, the two rectangles, each of which has opposing shorter sides, are combined together such that their central axes, each of which is parallel with the shorter sides, are aligned with each other.

That is, the mirror module 21 is designed as a mirror assembly comprised of a narrower-width rectangular portion and a wider-width rectangular portion. The narrower-width rectangular portion has a narrower width in its longitudinal direction, and the wider-width rectangular portion has a wider width in its longitudinal direction.

The mirror module 21 is vertically disposed on the motor 23, with the wider-width rectangular portion located to be lower than the narrower-width rectangular portion. Rotatably driving the motor 23 therefore allows the mirror module 21 to rotate about a central axis thereof. In the following description, the position of the central axis of the mirror module 21 serves as a scanning center.

The partition plate 22 is a circular plate-like member whose diameter is the same as the length of the wider-width portion in the longitudinal direction thereof. The partition plate 22 is divided into two semicircular portions. The partitioning plate 22 is fastened to the mirror module 21 while the semi-circular portions 1. Sandwich the narrower-width rectangular portion of the mirror module 21 from both major sides of the narrower-width rectangular portion
2. Abut on shoulders of the wider-width rectangular portion of the mirror module 21

The mirror module 21 is comprised of

1. An upper portion located above the partition plate 22 and constituting the narrower-width rectangular portion thereof 2. A lower portion located below the partition plate 22 and constituting the wider-width rectangular portion thereof The upper portion of the mirror module 21 will be referred to as a transmitted-light deflector 20a, and the lower portion of the mirror module 21 will be referred to as a received-light deflector 20b.

[2-2. Phototransmitter]

The phototransmitter 10 includes a pair of light sources 11 and 12. The phototransmitter 10 may also include a pair of photo transmission lenses 13 and 14 and a transmitted-light deflection mirror 15.

In the following description, the transmitted-light deflector 20a has opposing surfaces, and has, on each of the opposing surfaces, a reflection spot on which a light beam from each of the light sources 11 and 12 is incident. Each of the opposing surfaces of the transmitted-light deflector 20a is defined as a reference surface including the reflection spot and orthogonal to the rotational axis of the mirror module 21.

Each of the light sources 11 and 12 is a semiconductor laser.

The light source 11, which has a light emission surface, is located away from the reflection spot in the left side of the X-axis direction, with its light emission surface facing the transmitted-light reflector 20a.

The light source 12, which has a light emission surface, is located away from a deflection spot in the direction toward the rear side of the Z-axis direction, with its light emission surface facing toward the front side of the Z-axis direction; the deflection spot is located in a center region of a predetermined light-beam path between the reflection spot and the light source 11.

The light source 11 has a first vertical position in the vertical direction (i.e., the Y-axis direction), and the light source 12 has a second vertical position in the vertical direction, i.e. the Y-axis direction. The first vertical position of the light source 11 is arranged to be lower than the reference surfaces of the transmitted-light reflector 20a in the Y-axis direction, and the second vertical position of the light source 12 is arranged to be higher than the refence surfaces of the transmitted-light reflector 20a. That is, the first and second vertical positions of the respective light sources 11 and 12 are different from each other.

The light transmission lens 13 is arranged to face the light emission surface of the light source 11. Similarly, the light transmission lens 14 is arranged to face the light emission surface of the light source 12.

Figure 5:
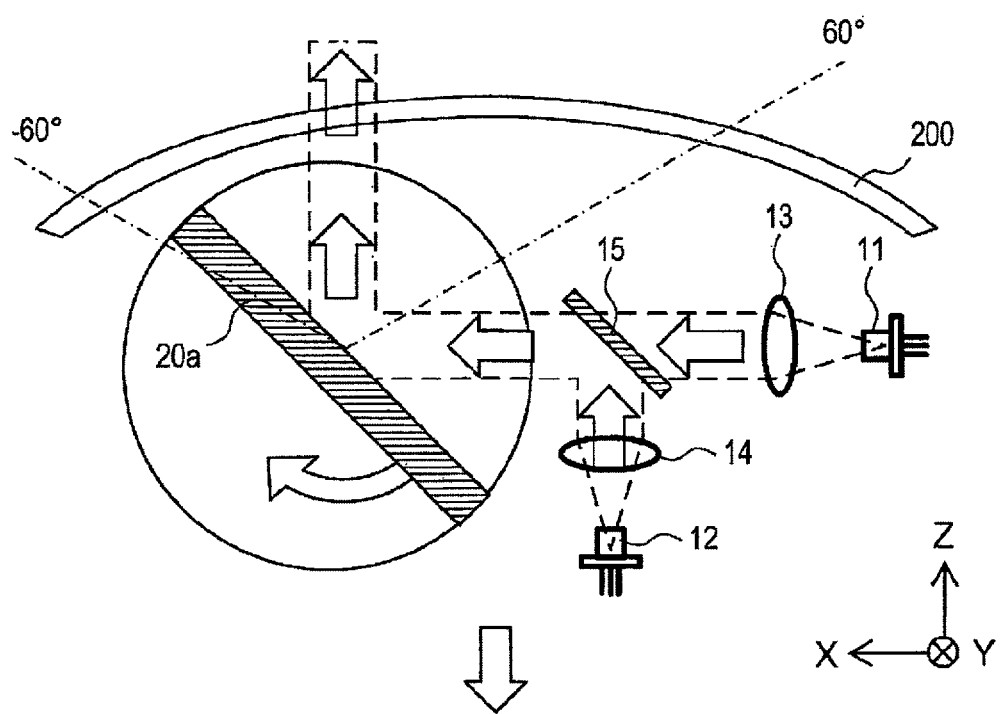
FIG. 5 is a diagram illustrating the path of light being transmitted and the arrangement of a transmitted light deflection mirror relative to the path of light.
Figure 5:
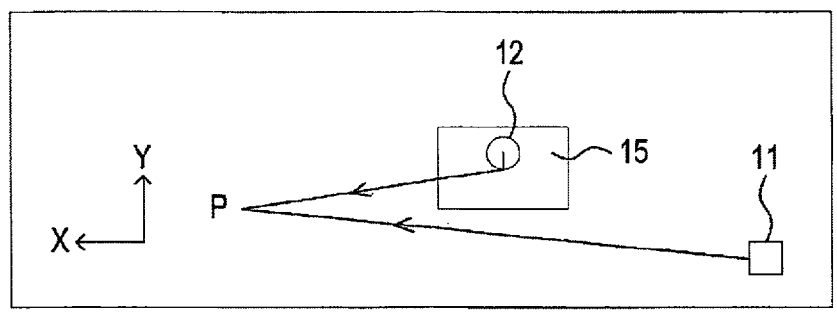

The transmitted-light deflection mirror 15 is disposed at the deflection spot, and configured to deflect the light beam, which has been transmitted from the light source 12 and passed through the light transmission lens 14, to thereby guide a deflected light beam to the reflection spot. In FIG. 5, the transmitted-light deflection mirror 15 is omitted.

Figure 6:
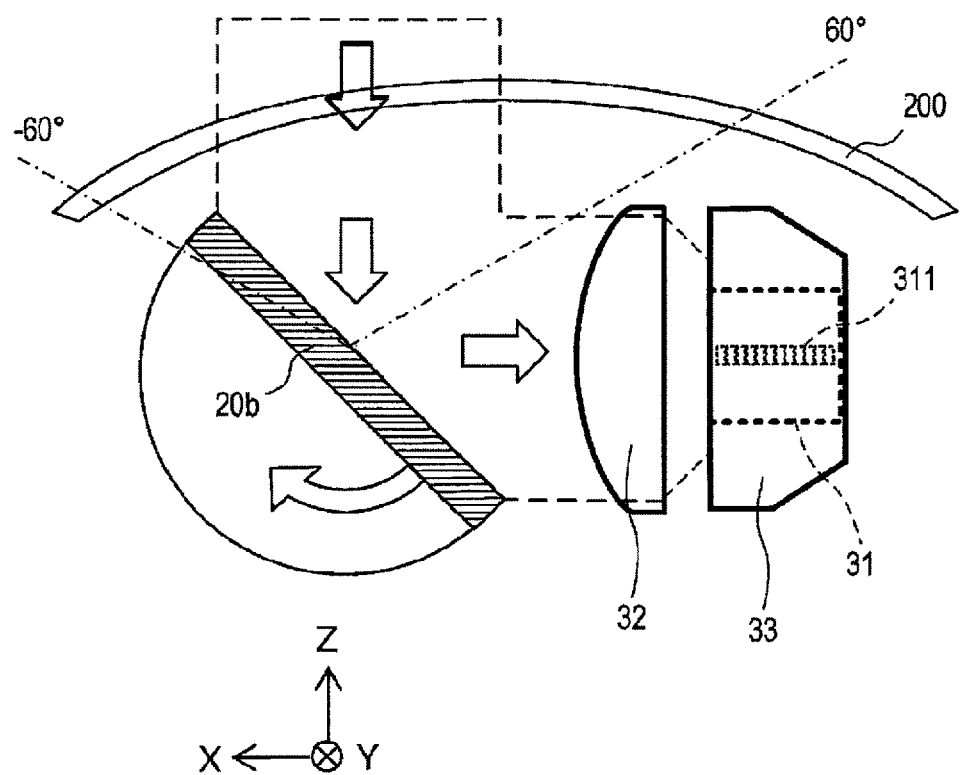
FIG. 6 is a diagram illustrating the path of a light beam being received.

The transmitted-light deflection mirror 15, as illustrated in FIG. 6, is arranged above the path of the light beam transmitted from the light source 11, passed through the light transmission lens 13, and traveling toward the reflection spot. This arrangement of the transmitted-light deflection mirror 15 prevents the transmitted-light deflection mirror 15 from obstructing the path of the light beam. The path of the light beam from the light source 11 to the reflection spot has the same length as the path of the light beam from the light source 12 through the transmitted-light deflection mirror 15 to the reflection spot.

[1-1-3. Photoreceiver]

As illustrated in FIGS. 2 to 5, the photoreceiver 30 includes a light reception device 31. The photoreceiver 30 may also include a light reception lens 32 and a received light deflection mirror 33.

The light reception device 31 is located beneath the received light deflection mirror 33. In FIG. 3, part of the frame 40 is omitted to clearly illustrate the arrangement of the components of the photoreceiver 30. As shown in FIG. 6, the light reception device 31 includes an APD array 311 having a plurality of APDs arranged in a line. The "APD" refers to an avalanche photodiode. The light reception device 31 is arranged such that a light reception surface of each of the APDs faces upward along the Y-axis direction. The APDs of the APD array 311 are arranged in the X-axis direction.

The received light deflection mirror 33, as illustrated in FIGS. 2 to 4, is located on the left side of the X-axis direction relative to the received-light deflector 20b. The received light deflection mirror 33 is arranged to deflect light, which is incident thereon through the photo reception lens 32, downward by a substantially right angle with respect to the Z-axis direction, thus causing deflected light to reach the light reception device 31.

The light reception lens 32 is disposed between the received-light deflector 20b and the received-light deflection mirror 33. The received light lens 32 has a predetermined aperture that enables a light beam, which has passed through the aperture of the received light lens 32 so as to enter the light reception device 31, to have a reduced width in the Z-axis direction; the reduced width of the light beam in the Z-axis direction is on the order of the width of the APD in the Z-axis direction.

[2-4. Frame]

The frame 40 is configured to combine the components of the phototransmitter 10, scanner 20, and photoreceiver 30 together, and mount the combined components to the inside of the housing 100 while these components are fixedly arranged at predetermined respective positions in the housing 100.

As shown in FIGS. 2 to 4, the frame 40 includes a lower section 41, a side section 42, and a rear section 43 thereof. The frame 40 also includes a partition section 44.

A light reception board 51 has a mount surface on which the light reception device 30 is mounted, and a motor board 52 has a mount surface on which the motor 23 is mounted. The light reception board 51 and the motor board 52 are attached to a bottom of the frame lower section 41.

The frame lower section 41 has formed therethrough a first hole through which light from the received light deflection mirror 33 to the light reception device 31 travels. The frame lower section 41 also has formed therethrough a second hole through which the motor 23 of the scanner 20 is disposed.

The mount surfaces of the light reception board 51 and motor board 52 where the light reception device 31 and the motor 23 are mounted are substantially coplanar.

The frame side section 42 has opposing front and rear surfaces, and is arranged such that the front surface faces the scanner 20. A cylindrical holder 421 projects from the front surface of the frame side section 42. The cylindrical holder 421 has a cylindrical opening with opposing front and rear ends, i.e. opposing right-side and left-side ends in the X-axis direction. The light transmission lens 13 is fitted in the front end of the cylindrical opening of the cylindrical holder 421.

A light emission board 53, to which the light source 11 has been assembled, is mounted to the rear surface of the frame side section 42. With the light emission board 53 mounted to the frame side section 42, the light source 11 is located at the rear end of the cylindrical opening of the cylindrical holder 421.

As with the frame side section 42, a cylindrical holder 431 projects from a front surface of the frame rear section 43. The cylindrical holder 431 has a cylindrical opening with opposing front and rear ends, i.e. opposing right-side and left-side ends in the X-axis direction. The light transmission lens 13 is fitted in the front end of the cylindrical opening of the cylindrical holder 431.

A light emission board 54, to which the light source 12 has been assembled, is mounted to the rear surface of the frame rear section 43. With the light emission board 5 mounted to the frame rear section 43, the light source 12 is located at the rear end of the cylindrical opening of the cylindrical holder 431.

The partition section 44 is provided at a predetermined position to place a partition between a space in which the components of the phototransmitter 10 are located and a space in which the components of the photoreceiver 30 are located. To the partition section 44, the transmitted-light reflection mirror 15, received light deflection mirror 33, and light reception lens 32 are assembled thereto.

The light reception board 51 and the pair of light transmission boards 53 and 54 are mounted to the frame 40 with screws. That is, adjusting at least one of the location and angle of the light reception board 51 with screws allows at least one of the location and angle of the light reception device 31 to be finely adjusted three-dimensionally. Similarly, adjusting at least one of the location and angle of each of the light emission boards 53 and 54 allows at least one of the location and angle of the corresponding one of the light sources 11 and 12 to be finely adjusted three-dimensionally.

The holder 421 is integrated with the frame side section 4, but may be integrated with the light emission board 53. The holder 431 is integrated with the frame rear section 43, but may be integrated with the light emission board 54.

As shown in FIG. 4, the light detection module 2 whose components are integrated with each other by the frame 40 has a scanning central axis As located offset by a predetermined distance from a window central axis Ac of the optical window 200 in the right side of the X-axis direction.

The window central axis Ac is defined as an axis that passes through a center of the optical window 200 in the X-axis direction and extends along the Z-axis direction; the center of the optical window 200 will be referred to as a window center.

That is, the window central axis Ac indicates the position of the window center in a predetermined beam scanning direction. The rotational axis of the mirror motor 21, i.e. an axis that passes through the scanning center and extends along the Z-axis direction is defined as the scanning central axis As. The scanning center serves as an apparent light-beam generator that generates a light beam to be scanned by the lidar device 1 as seen from the outside of the lidar device 1.

[2-5. Operation of Light Detection Module]

As illustrated in FIG. 5, a light beam transmitted from the light source 11 passes through the light transmission lens 13 and thereafter reaches one of the reflection surfaces of the transmitted-light deflection unit 20a. A light beam transmitted from the light source 12 passes through the light transmission lens 14 and is deflected by the transmitted-light deflection mirror 15 at a substantially right angle. The light beam deflected by the mirror 15a thereafter travels to enter the other of the reflection surfaces of the transmitted-light deflection unit 20a.

The light beams incident on the transmitted-light deflection unit 20a are each transmitted in a direction determined by the rotational position of the mirror module 21. A region in which the light beams are irradiated serves as a scanning region. For example, the scanning region has a range of ±60°, with the front direction being along the Z-axis direction being 0°.

As illustrated in FIG. 6, reflected light beams from a detection target located in a predetermined direction dependent on the rotational position of the mirror module 21 arrive at the received-light detection unit 20b as arrival light beams. The arrival light beams are each reflected by the received-light deflection unit 20b so as to be deflected thereby. The deflected light beams are thereafter received by the light reception device 31 via the light reception lens 32 and the received light deflection mirror 33. The predetermined direction dependent on the rotational position of the mirror module 21 refers to a direction of a light beam emitted from the transmitted-light deflection unit 20a.

That is, the lidar device 1 is configured to rotate the mirror module 21 to thereby mechanically perform the horizontal scanning, i.e. the main scanning, of laser beams.

3. Optical Window

Figure 7:
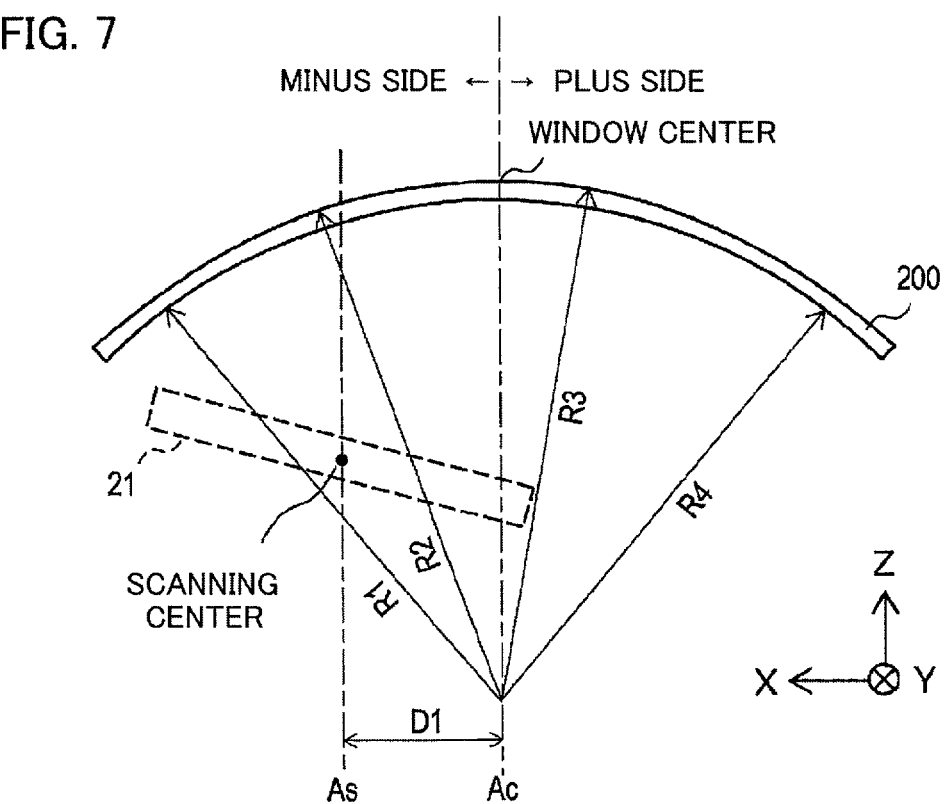
FIG. 7 is a diagram illustrating design parameters for use in designing an optical window, with values of the parameters in one of two parts of the optical window, which is partitioned at a center thereof, being different from values of the corresponding parameters in the other of the two parts of the optical window.
Figure 8:
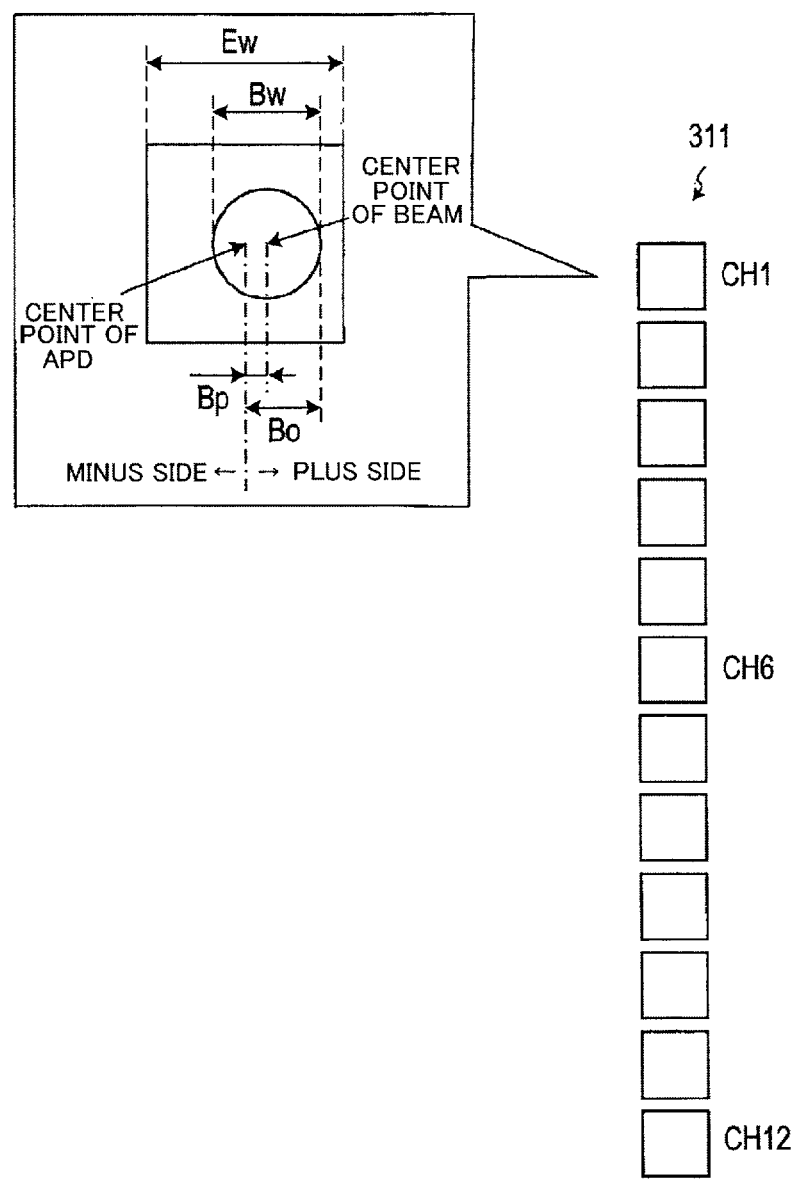
FIG. 8 is a diagram illustrating evaluation parameters for use in evaluating the optical window.

The optical window 200 has a cross section along a scanning surface that includes a scanning direction and a transmission direction of each light beam transmitted from the light detection module 2, and the cross section has, as illustrated in FIG. 7, a predetermined shape that is convexly curved toward the outside of the housing 100. For example, the shape of the cross section of the optical window 200 is asymmetrical about the window central axis Ac.

The optical window 200 mounted to the housing 100 has an outer side surface directed toward the outside of the housing 100, and an inner side surface directed toward the inside of the housing 100. The X-axis direction has a minus side oriented toward the scanning center (i.e. the scanning center axis As) from the window center axis Ac, and a plus side oriented to be opposite to the minus side. The minimum distance between the window central axis Ac and the scanning central axis As is defined as D1.

The inner surface of a minus side portion of the optical window 200 with respect to the window center axis Ac has a predetermined radius of curvature R1, and the inner surface of a plus side portion of the optical window 200 with respect to the window center axis Ac has a predetermined radius of curvature R4. The outer surface of the minus side portion of the optical window 200 with respect to the window center axis Ac has a predetermined radius of curvature R2, and the outer surface of the plus side portion of the optical window 200 with respect to the window center axis Ac has a predetermined radius of curvature R3. These radii R1, R2, R3, and R4 of curvature share a predetermined common center share a common center point.

These radii of curvature R1 to R4 can be defined to satisfy one of the following relations (1) to (3):

$$R1 \neq R4 \cap R2 = R3 \qquad (1)$$

$$R1 = R4 \cap R2 \neq R3 \qquad (2)$$

$$R1 \neq R4 \cap R2 \neq R3 \qquad (3)$$

The relation (1) shows a case where the radii of curvature R1 and R4 of the inner surfaces of the optical window 200 are set to be different from each other, while the radii of curvature R2 and R3 of the outer surfaces of the optical window 200 are set to be a constant value.

The relation (2) shows a case where the radii of curvature R1 and R4 of the inner surfaces of the optical window 200 are set to be a constant value while the radii of curvature of the outer surfaces of the optical window 200 R2 and R3 are set to be different from each other.

The relation (3) shows a further case where the radii of curvature R1, R2, R3, and R4 are set to be different from each other. In the following description, the radii of curvature R1 to R4 each correspond to a design parameter.

The radii of curvature R1 to R4 may be set as follows.

First, combinations, i.e. combination patterns, of the radii of curvature R1 to R4 are set. At least one determination parameter for a selected one of the combinations is calculated based on a simulation or measured in each of a plurality of angular directions within the scanning region. This measurement or calculation is performed for each of the combinations.

The at least one determination parameter for a selected combination and for a selected angular direction calculated or measured in this embodiment includes at least one of a beam position Bp and a beam width Bw.

The beam position Bp for a selected combination and for a selected angular direction indicates the position of a corresponding received light beam incident on the APD array 311 of the light reception device 31. The beam width Bw for a selected combination and for a selected angular direction indicates a width of a corresponding received light beam incident on the APD array 311 of the light reception device 31.

The received light beam refers to a beam of light is reflected by the mirror module 21, and passes through the optical window 200 so as to be emitted from the optical window 200. When a light beam is generated based on reflection of the emitted light beam from a target, the reflected light beam is traveled to pass through the optical window 200. Then, the reflected light beam is travelled along a predetermined optical path so as to be incident on the APD array 311.

The beam position Bp is determined based on the center point of the diameter of the reflected light beam on a corresponding APD in a direction perpendicular to the direction in which the APDs of the APD array 311 are aligned; the beam position Bp on a corresponding APD is expressed with respect to the center point of the corresponding APD.

As the at least one determination parameter for a selected combination and for a selected angular direction calculated or measured in this embodiment, an outer edge position Bo of a corresponding received light beam may be used. The outer edge position Bo of a corresponding received light beam, which will also be referred to as a beam outer edge position Bo, is determined as follows:

Specifically, a first value is calculated by adding a radius of the corresponding received light beam, which is expressed as Bw/2, to the beam position Bp, and a second value is calculated by subtracting the beam radius Bw/2 from the beam position Bp. Then, the first value or the second value, whichever has a greater absolute value, is used as the beam edge position Bo.

For example, the plurality of angular directions may be spaced apart by 15° within the scanning region of ±60°.

One or more combinations in all the combinations of radius of curvatures R1 to R4, the beam edge positions Bo of which satisfy a predetermined allowable outer edge condition, are preselected, and one combination in the selected combinations, which has the smallest variation throughout the scanning region, is finally selected.

As the allowable outer edge condition, for example, an absolute value of the beam outer edge position Bp is required to be less than an upper limit; the upper limit is set to a value less than or equal to the width Ew of an APD of the APDs. That is, the beam outer edge position Bp is required to have an absolute value that prevents part of a corresponding received light beam from lying off the edge of a corresponding APD.

4. Example Design

Figure 9:
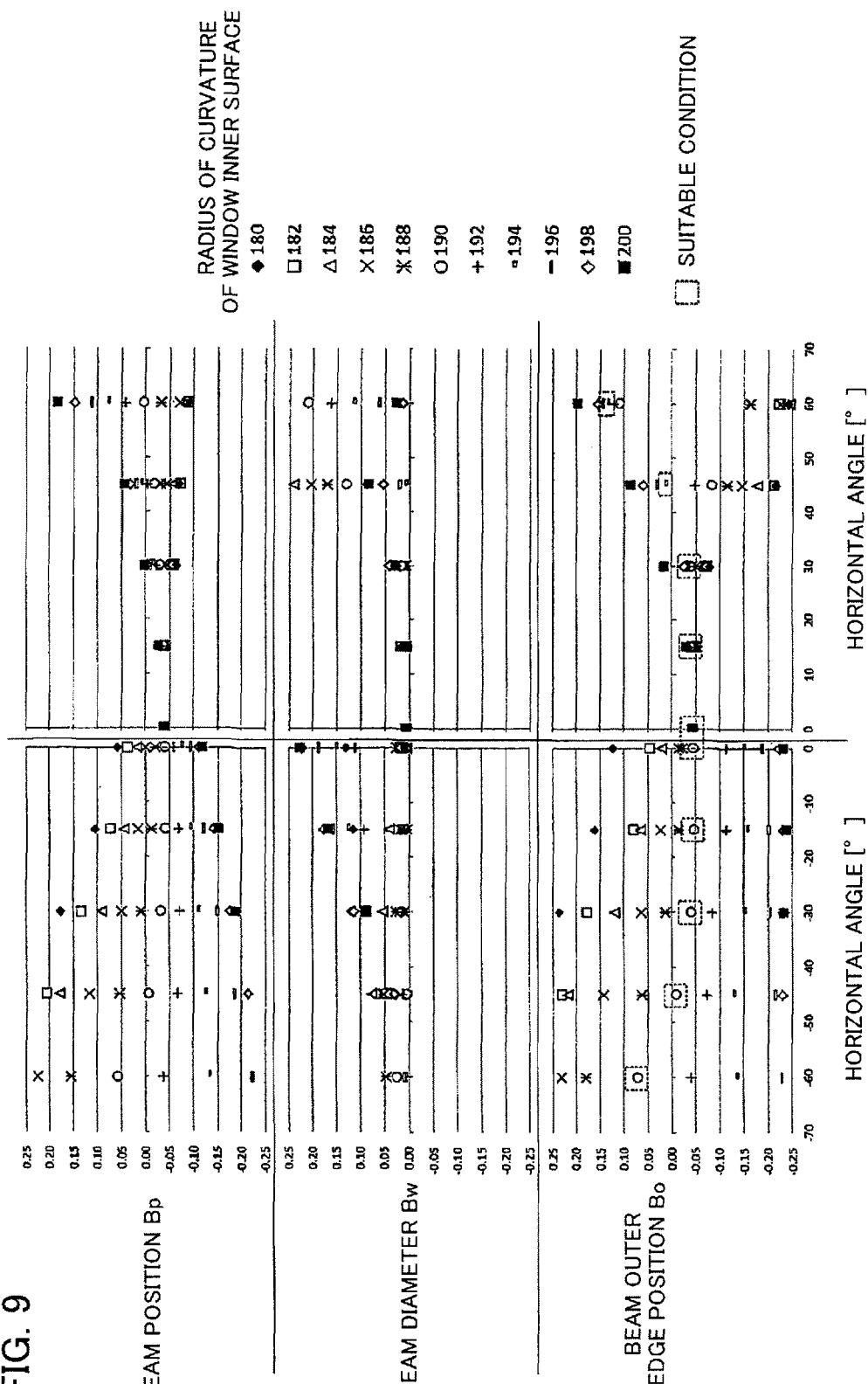
FIG. 9 is a graph showing values of the evaluation parameters calculated based on simulations performed using different values of the radius of curvature of an inner side of the optical window with the radius of curvature of an outer side of the optical window being constant.

FIG. 9 shows values of the beam position Bp, beam diameter Bw, and beam outer edge position Bo calculated based on simulations performed with the outer radii of curvature R2 and R3 of the optical window 200 being constant and the inner radii of curvature R1 and R4 being different from each other.

Specifically, the radii of curvature R2 and R3 of the outer surfaces of the optical window 200 were set to 200 mm, while the radii of curvature R1 and R4 of the inner surfaces of the optical window 200 were varied by 2 mm within a range from 180 mm to 200 mm. The distance D1 between the window central axis Ac and the scanning central axis As was set to 17 mm, and the width of an APD of the APDs was set to 0.45 mm. In this setting, if the outer edge position Bp of a corresponding received light beam has an absolute value of greater than 0.225 mm, at least part of the corresponding received light beam incident on a corresponding APD in the APDs will be located off the edge thereof. Furthermore, values of the beam position Bp, beam diameter Bw, and outer edge position Bo of a corresponding received light beam on a selected APD channel CH6, which is located near the center of the APD array 311, in the APD channels CH1 to CH12 were calculated.

FIG. 9 shows that setting the radius of curvature R1 of the inner surface of the minus side portion of the optical window 200 to 190 mm, and the radius of curvature R4 of the inner surface of the plus side portion of the optical window 200 to 194 mm efficiently minimizes variations in received light beams due to the optical window 200.

Figure 10:
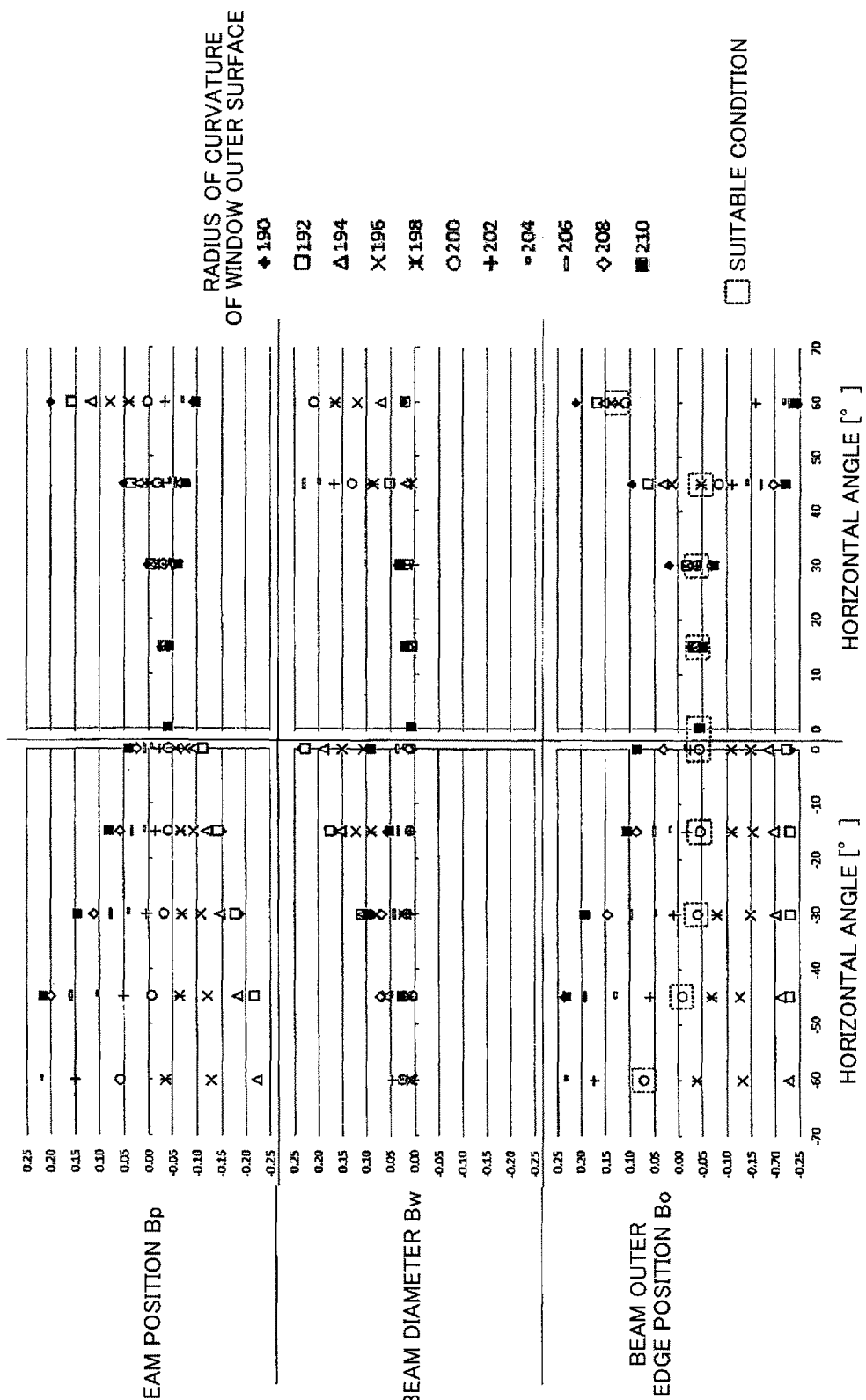
FIG. 10 is a graph showing values of the evaluation parameters calculated based on simulations performed using different values of the radius of curvature of the outer side of the optical window with the radius of curvature of the inner side of the optical window being constant.

FIG. 10 shows values of the beam position Bp, beam diameter Bw, and beam outer edge position Bo calculated based on simulations performed with the inner radii of curvature R1 and R4 of the optical window 200 being constant and the outer radii of curvature R2 and R3 being different from each other.

Specifically, the radii of curvature R1 and R4 of the inner surfaces of the optical window 200 were set to 190 mm, while the radii of curvature R2 and R3 of the outer surfaces of the optical window 200 were varied by 2 mm within a range from 190 mm to 210 mm.

FIG. 10 shows that setting the radius of curvature R2 of the outer surface of the minus side portion of the optical window 200 to 200 mm, and the radius of curvature R3 of the outer surface of the plus side portion of the optical window 200 to 198 mm efficiently minimizes variations in received light beams due to the optical window 200.

5. Advantageous Effects

The present embodiment described in detail above produces the following advantageous effects.

(5a) The lidar device 1 is configured such that the optical window 200 has an asymmetrical shape about the window center, and the scanning center is located offset from the window center axis Ac.

This configuration reduces variations in light beams, which has been traveled to pass through the optical window 200 so as to be affected thereby; the light beams have different scanning angular directions due to the offset of the scanning center relative to the window central axis Ac.

(5b) In the lidar device 1, the shape of the optical window 200 is determined based on the radii of curvature thereof, allowing the optical window 200 to be designed and manufactured easily.

(5c) The lidar device 1 is configured such that the optical window 200 has an even outer surface and an uneven inner surface. This configuration enables the lidar device 1 to produce the above advantageous effects while preventing a symmetrical outer appearance of the device 1 from being impaired.

6. Modifications

The present embodiment according to the present disclosure has now been described. The present disclosure is however not limited to the present embodiment described above, and various modifications can be made thereto.

(6a) In the present embodiment described above, the optical window 200 is partitioned into two portions that have the window center of the optical window 200 as their boundary, and the radius of curvature R1, R2, R3, or R4 of one of the two regions being set to be different from the corresponding radius of curvature of the other of the two regions. The optical window 200 can be partitioned into two portions that have another portion of the optical window 200 as their boundary, or can be partitioned into three or more portions.

Figure 11:
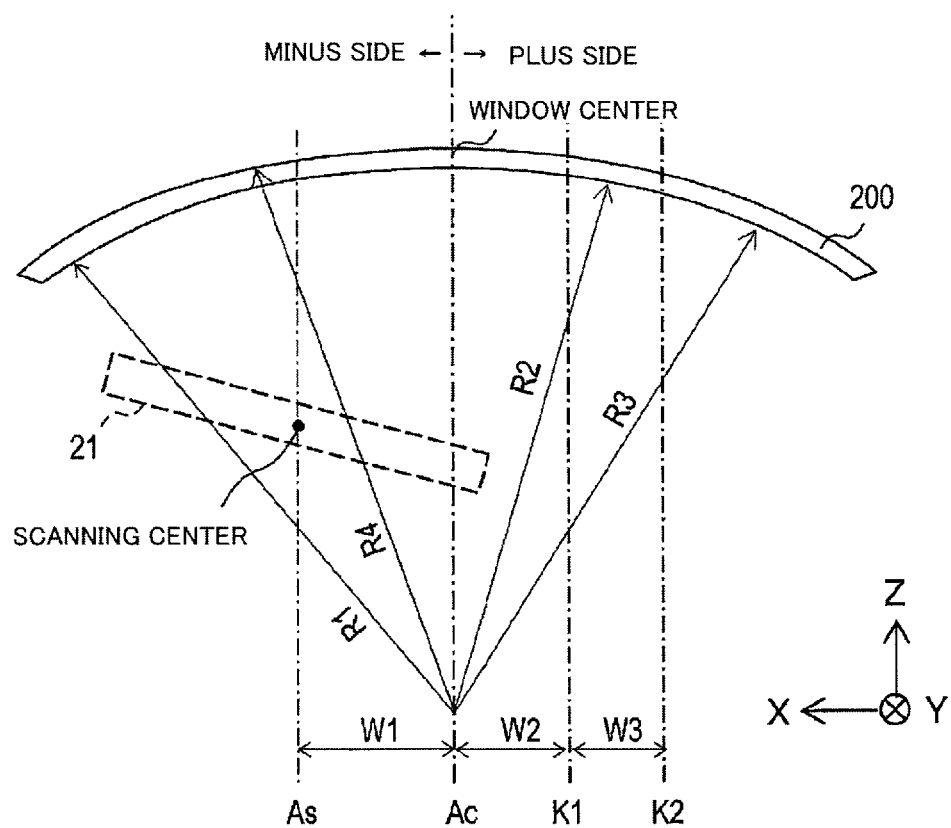
FIG. 11 is a diagram illustrating design parameters for use in designing an optical window, with values of the parameters in each of three parts of the optical window being different from one another.

For example, as shown in FIG. 11, two boundary axes K1 and K2 may be provided on the plus side portion of the optical window 200 with respect to the window central axis Ac. Here, the boundary axis K1 is located at a distance D1 (e.g., 10 mm) from the window central axis Ac toward the plus side relative to the window center axis Ac, and the boundary axis K2 is located at a distance D3 (e.g., 10 mm) from the boundary axis K1 toward the plus side relative to the boundary K1.

The inner surface of a minus side portion of the optical window 200 with respect to the boundary axis K1 has an inner radius of curvature R1, and the inner surface of a portion of the optical window 200 located between the boundary axes K1 and K2 has an inner radius of curvature R2. The inner surface of a plus side portion of the optical window 200 with respect to the boundary axis K2 has an inner surface radius of curvature R3, and the outer surface of the optical window 200 has an outer radius of curvature R4.

Figure 12:
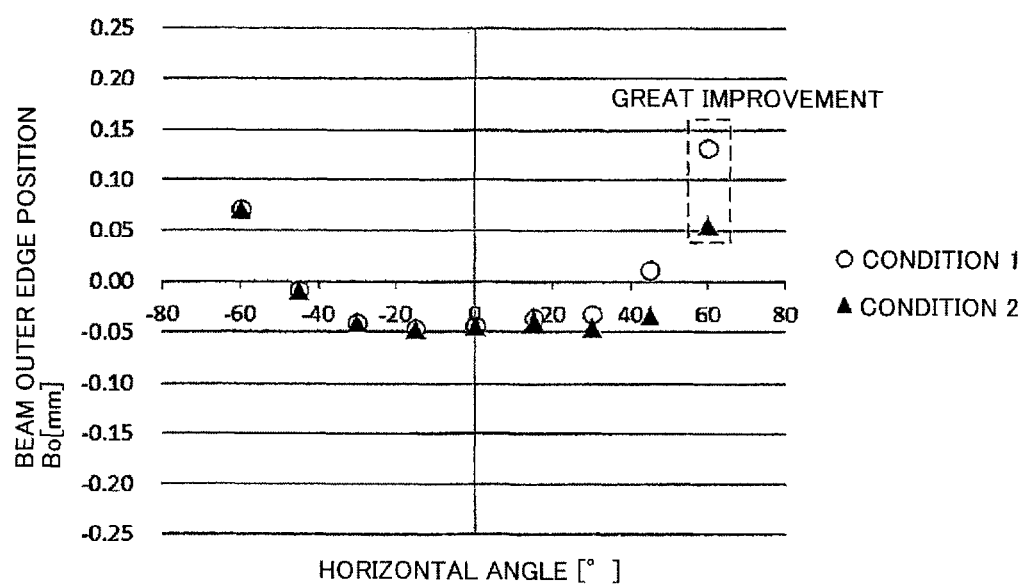
FIG. 12 is a graph showing (i) Values of the evaluation parameters calculated based on a simulation performed using different values of the radius of curvature of the inner side of respective two parts of the optical window with the radius of curvature of the outer side of the optical window being constant, the optical window being partitioned at a portion offset from the center thereof (ii) Values of the evaluation parameters calculated based on a simulation performed using different values of the radius of curvature of the inner side of respective three parts of the optical window with the radius of curvature of the outer side of the optical window being constant

FIG. 12 shows values of the beam outer edge position Bo calculated based on simulations performed in each of the following first and second simulation conditions:

The first simulation condition is designed such that the inner radius of curvature R1 is set to 190 mm, the inner radius of curvature R2 is set to 194 mm, the inner radius of curvature R3 is set to 194 mm, and the outer radius of curvature R4 is set to 200 mm.

The second simulation condition is designed such that the inner radius of curvature R1 is set to 190 mm, the inner radius of curvature R2 is set to 192 mm, the inner radius of curvature R3 is set to 196 mm, and the outer radius of curvature R4 is set to 200 mm.

That is, the first simulation condition indicates that the optical window 200 has two portions partitioned by a boundary that is shifted from the window center axis Ac (i.e., the window center), and the second simulation condition indicates that the optical window 200 has three partitioned portions that have different inner radii of curvature.

FIG. 12 shows that variations in the beam outer edge positions Bo simulated based on the first simulation condition are reduced to substantially the same extent as in the case shown in FIG. 9 where the boundary is located at the window central axis. In contrast, FIG. 12 shows that variations in the beam outer edge positions Bo simulated based on the second simulation condition are reduced to a greater degree in a positive angular grating side portion of the optical window 200.

(6b) In the present embodiment described above, the scanning central axis As is located offset on the right side relative to the window central axis Ac as seen from the front of the optical window 200. Alternatively, the scanning center axis As can be located offset on the left side relative to the window central axis Ac as seen from the front of the optical window 200.

(6c) In the present embodiment described above, the shape of the optical window 200 is evaluated using the beam outer edge position Bo, with the allowable outer edge condition requiring an absolute value of the beam outer edge position Bo to be located within the light reception surface of an APD. The present disclosure is however not limited to this evaluation. For example, the beam position Bp or beam diameter Bw may be used to evaluate the shape of the optical window 200. In a case of using the beam position Bp, for example, the optical window 200 may be evaluated on allowable position condition that the beam position Bp is located within the light reception surface of an APD. In the case of using the beam diameter Bw, for example, the optical window 200 may be evaluated on an allowable diameter condition that the beam diameter Bw is less than or equal to the width Ew of an APD.

(6d) A plurality of functions of one component in the above embodiment may be implemented by a plurality of components, and one function of one component may be implemented by a plurality of components. A plurality of components of a plurality of components may be implemented by one component, and one function implemented by a plurality of components may be implemented by one component. Part of the configuration in the above embodiment may be eliminated. Part of the configuration of the above embodiment may be added to or replaced with part of a configuration of at least one of the modifications.

(6e) In addition to the lidar device 1 described above, the present disclosure may be implemented in various forms, such as a system including the lidar device 1 as a component.

What is claimed is:

1. A lidar device comprising:
a light detection module disposed in a housing that has an opening, the light detection module being configured to:
transmit a transmitted light beam in a transmission direction to scan the transmitted light beam in a scanning direction, the transmission direction being predetermined and the scanning direction being predetermined; and
receive a reflected light beam arriving from a scanning region of the transmitted light beam; and an optical window attached to the opening of the housing and curved toward an outside of the housing, the optical window having:
a window center in the scanning direction;
an outer side surface facing the outside of the housing; and
an inner side surface facing an inside of the housing,
the optical window being configured to enable:
the transmitted light beam to pass therethrough; and
the received reflected light beam to pass therethrough;
wherein:
the light detection module is arranged such that a scanning center indicative of a center of the scanning of the light beam is located to be different from the window center in the scanning direction;
the optical window has a target surface that is one of the outer side surface and the inner side surface;
the target surface has a cross-section along a scanning surface of the transmitted light beam, the scanning surface being defined by the scanning direction of the transmitted light beam and the transmission direction of the light beam from the light detection module, the cross-section of the target surface being shaped to be asymmetrical about the window center;
the cross-section of the target surface is configured to have partitioned sections in the scanning direction, the partitioned sections respectively having different radii of curvature;
the light detection module has a light reception device;
the reflected light beam arriving from the scanning region is incident at a position in the light reception device; and
the target surface has a radius of curvature that is determined to cause the position of the reflected light beam at the light reception device to satisfy a predetermined allowable position condition.

2. The lidar device according to claim 1, wherein the target surface is the inner side surface of the optical window.

3. The lidar device according to claim 1, wherein the cross-section of the target surface is configured such that a radius of curvature of a first partition selected from the partitions is smaller than a radius of curvature of a second partition selected from the partitions, the first partition being closer to the scanning center than the second partition is as viewed from the window center.

4. A lidar device comprising:
a light detection module disposed in a housing that has an opening, the light detection module being configured to:
transmit a transmitted light beam in a transmission direction to scan the transmitted light beam in a scanning direction, the transmission direction being predetermined and the scanning direction being predetermined; and
receive a reflected light beam arriving from a scanning region of the transmitted light beam; and
an optical window attached to the opening of the housing and curved toward an outside of the housing, the optical window having:
a window center in the scanning direction;
an outer side surface facing the outside of the housing; and
an inner side surface facing an inside of the housing,
the optical window being configured to enable:
the transmitted light beam to pass therethrough; and
the received reflected light beam to pass therethrough;
wherein:
the light detection module is arranged such that a scanning center indicative of a center of the scanning of the light beam is located to be different from the window center in the scanning direction;
the optical window has a target surface that is one of the outer side surface and the inner side surface;
the target surface has a cross-section along a scanning surface of the transmitted light beam, the scanning surface being defined by the scanning direction of the transmitted light beam and the transmission direction of the light beam from the light detection module, the cross-section of the target surface being shaped to be asymmetrical about the window center;
the cross-section of the target surface is configured to have partitioned sections in the scanning direction, the partitioned sections respectively having different radii of curvature;
the light detection module has a light reception device;
the reflected light beam arriving from the scanning region is incident on the light reception device while having a diameter; and
the target surface has a radius of curvature that is determined to cause the diameter of the reflected light beam at the light reception device to satisfy a predetermined allowable diameter condition.

5. The lidar device according to claim 4, wherein the target surface is the inner side surface of the optical window.

6. The lidar device according to claim 4, wherein the cross-section of the target surface is configured such that a radius of curvature of a first partition selected from the partitions is smaller than a radius of curvature of a second partition selected from the partitions, the first partition being closer to the scanning center than the second partition is as viewed from the window center.

7. A lidar device comprising:
a light detection module disposed in a housing that has an opening, the light detection module being configured to:
transmit a transmitted light beam in a transmission direction to scan the transmitted light beam in a scanning direction, the transmission direction being predetermined and the scanning direction being predetermined; and
receive a reflected light beam arriving from a scanning region of the transmitted light beam; and
an optical window attached to the opening of the housing and curved toward an outside of the housing, the optical window having:
a window center in the scanning direction;
an outer side surface facing the outside of the housing; and
an inner side surface facing an inside of the housing,
the optical window being configured to enable:
the transmitted light beam to pass therethrough; and
the received reflected light beam to pass therethrough;
wherein:
the light detection module is arranged such that a scanning center indicative of a center of the scanning of the light beam is located to be different from the window center in the scanning direction;
the optical window has a target surface that is one of the outer side surface and the inner side surface;

the target surface has a cross-section along a scanning surface of the transmitted light beam, the scanning surface being defined by the scanning direction of the transmitted light beam and the transmission direction of the light beam from the light detection module, the cross-section of the target surface being shaped to be asymmetrical about the window center;

the cross-section of the target surface is configured to have partitioned sections in the scanning direction, the partitioned sections respectively having different radii of curvature;

the light detection module has a light reception device that has a center point;

the reflected light beam arriving from the scanning region is incident as a received light beam at a position in the light reception device, the position being represented as a beam position expressed with respect to the center point of the light detection module, the received light beam having a radius; and the target surface has a radius of curvature that is determined to cause an outer edge position of the received light beam to satisfy a predetermined allowable outer-edge condition, the outer edge position of the received light beam being defined as a sum of the beam position and the radius of the received light beam.

8. The lidar device according to claim 7, wherein the target surface is the inner side surface of the optical window.

9. The lidar device according to claim 7, wherein the cross-section of the target surface is configured such that a radius of curvature of a first partition selected from the partitions is smaller than a radius of curvature of a second partition selected from the partitions, the first partition being closer to the scanning center than the second partition is as viewed from the window center.

* * * * *